(12) United States Patent
Bose (10) Patent No.: US 8,764,358 B2
(45) Date of Patent: Jul. 1, 2014

(54) RACK FOR LOAD BARS

(71) Applicant: Joseph M. Bose, Kalkaska, MI (US)

(72) Inventor: Joseph M. Bose, Kalkaska, MI (US)

(*) Notice: Subject to any disclaimer, the term of this patent is extended or adjusted under 35 U.S.C. 154(b) by 0 days.

(21) Appl. No.: 13/680,136

(22) Filed: Nov. 19, 2012

(65) Prior Publication Data

US 2013/0136556 A1      May 30, 2013

Related U.S. Application Data

(60) Provisional application No. 61/564,986, filed on Nov. 30, 2011.

(51) Int. Cl.
*B60P 7/12*          (2006.01)
*E05B 73/00*       (2006.01)

(52) U.S. Cl.
USPC ............................................. 410/32

(58) Field of Classification Search
CPC ............... B60P 7/08; B60P 7/12; E05B 73/00
USPC ........................ 410/32–34; 211/60.1; 224/405
See application file for complete search history.

(56) References Cited

U.S. PATENT DOCUMENTS

| | | | | |
|---|---|---|---|---|
| 2,657,889 A | * | 11/1953 | Smalley ....................... | 248/67.7 |
| 4,662,805 A | * | 5/1987 | Tamez et al. ................ | 410/33 |
| 4,723,880 A | * | 2/1988 | Stumpf, Jr. .................. | 410/143 |
| 5,052,601 A | * | 10/1991 | Carter et al. ................ | 224/401 |
| 5,060,810 A | * | 10/1991 | Jones ........................... | 211/59.4 |
| 6,120,224 A | * | 9/2000 | Powell ........................ | 410/36 |
| 6,283,688 B1 | * | 9/2001 | Powell ........................ | 410/36 |
| 7,628,281 B2 | | 12/2009 | Sopel | |
| 7,861,871 B2 | * | 1/2011 | Kao ............................ | 211/70.6 |
| D660,604 S | * | 5/2012 | Barnett ...................... | D6/323 |

OTHER PUBLICATIONS

Kinedyne, Interior Van Products—Bartender Cargo Bar Holder, Kinedyne 2010 Cargo Control Catalog, 2010, 14 page excerpt comprising pp. 38-51) (see p. 49), Kinedyne Corporation (www.kinedyne.com), U.S.

* cited by examiner

*Primary Examiner* — H Gutman
(74) *Attorney, Agent, or Firm* — Northern Michigan Patent Law, PLC (57) ABSTRACT

A rack for storing load bars against the side wall of the cargo area of a cargo truck equipped with E-track. The rack includes a generally U-shaped base having a rear side equipped with E-clips for mounting on the side wall, a closed end, a front side having two vertically-spaced horizontal cantilevered retainer arms substantially parallel to the side wall when the rack is mounted, and an open end. Load bars are inserted and removed from the rack in a plane parallel to the side wall the cargo area, in a vertical orientation, and are secured in place with a horizontal adjustable-length strap operable in the space between the front retainer arms to selectively close off the open end of the rack.

10 Claims, 5 Drawing Sheets

RACK FOR LOAD BARS

RELATED APPLICATIONS/PRIORITY BENEFIT CLAIM

This application claims the benefit of U.S. Provisional Application No. 61/564,986, filed Nov. 30, 2011 by the same inventor (Bose), the entirety of which provisional application is hereby incorporated by reference.

FIELD

The subject matter of the present application is in the field of cargo load bars used in the cargo areas or trailers of freight trucks and vans, and more particularly in the field of interior storage devices for such load bars.

BACKGROUND

Figure 1:
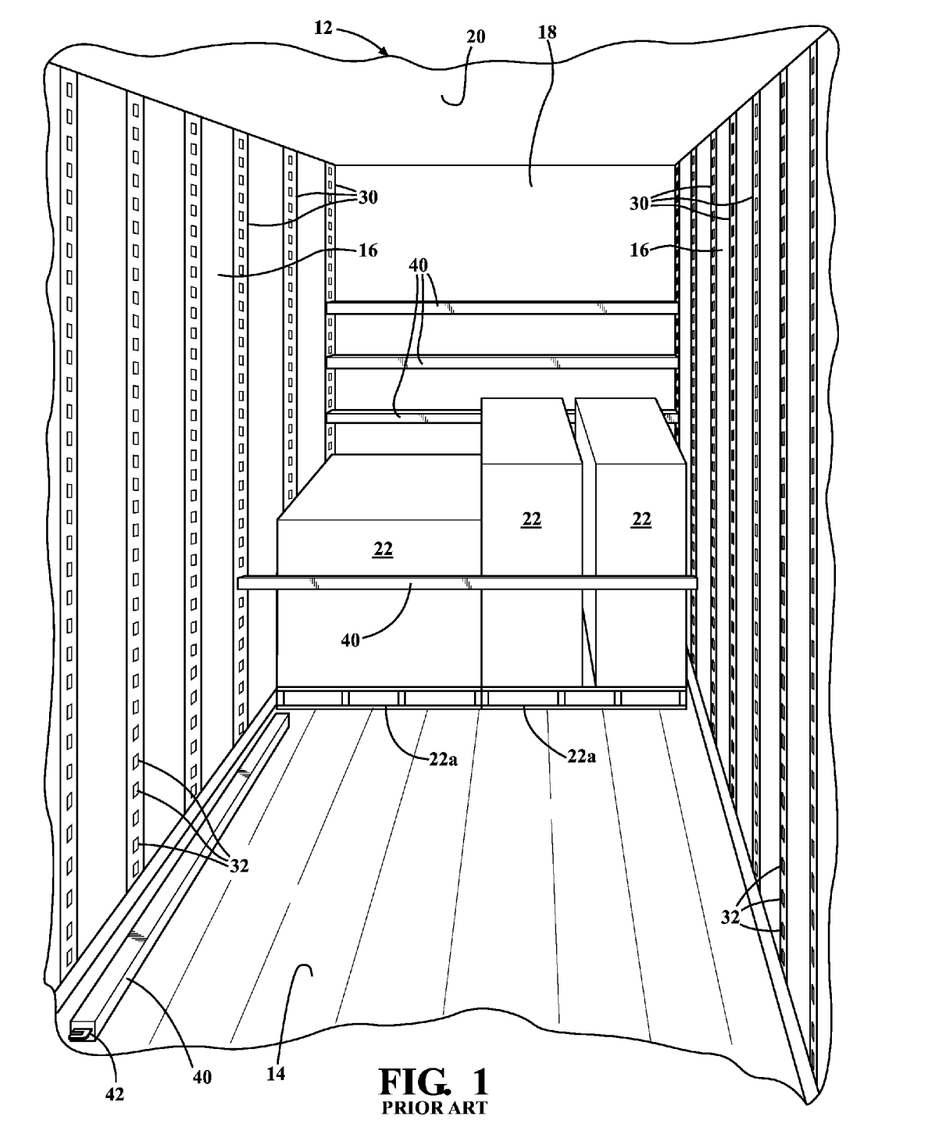
FIG. 1 is a door-end perspective view of the cargo area of a van or truck equipped with E-track on the side walls, showing common prior ways to store unused load bars.

"Load bars" or "cargo bars" are length-adjustable load bracing bars used in the wall-enclosed cargo areas of freight trucks and vans. Referring to FIG. 1, the cargo area 12 of a typical van or truck is partially illustrated with a floor 14, side walls 16, end wall 18, and roof 20. The side walls of such cargo areas are commonly equipped with "E-tracks" 30, comprising metal rails with specially shaped slots 32 adapted to receive mating "E-clips" 42 on the ends of load bars 40. E-clips 42 are designed to latch into slots 40, remaining securely connected until intentionally released, in order to lock the load bars 40 horizontally between side walls 16 in various cargo-stabilizing positions.

E-track is generally known to those in the field of loading and securing cargo in commercial truck interiors. E-track is believed to be an industry standard for cargo control, and is commercially available under different trademarks. E-track 30 may be a vertical type designed to be mounted vertically on side walls 16, with vertical slots 32 aligned with the long axis of the track 30, as shown in FIG. 1; or, E-track may be a horizontal type designed to be mounted horizontally (running from front to back) on side walls 16, with vertical slots perpendicular to the long axis of the track. In both cases the slots 30 are oriented vertically in use, so E-clips 42 are accordingly mounted on the ends of load bars 40 for engaging vertical slots.

When load bars 40 are not being used to secure cargo 22, the bars are often stored horizontally against end wall 18 as shown, clipped into the last row of E-track nearest the end wall. Alternately, unused bars 40 are often laid on the floor 14. Both storage methods have drawbacks. When stored against end wall 18, bars 40 are difficult to retrieve without climbing over cargo 22, which is both inconvenient and a safety hazard. When unused bars 40 are laid on floor 14, they can interfere with loading and unloading, especially when using pallets 22a moved by forklift equipment, and they can present a tripping hazard to people moving around in the cargo area. Load bars 40 may also be damaged if not stored properly, especially at their latching ends 42.

Some prior attempts have been made to store E-track compatible load bars in a more convenient and safe manner. One such attempt is shown in U.S. Pat. No. 7,628,281 to Sopel. Sopel discloses a wall-mounted rack, recommended for use in vertically spaced pairs and adapted to be clipped into horizontal E-track. The racks include outwardly-projecting arms that define frontward opening "slots" or compartments, each compartment capable of receiving a vertically oriented load bar. The ends of the arms include holes aligned to receive a horizontal retainer rod. With the retainer rod removed, load bars are placed vertically in the compartments, one rod per compartment. The retainer rod is then inserted through the aligned holes to secure the load bars in the rack.

The racks in the Sopel patent have several disadvantages. For example, they are recommended for use in pairs, requiring careful and sometimes tricky positioning of upper and lower racks relative to the E-slots for proper alignment of the racks' respective load bar compartments. The racks' compartment-defining arms project outwardly into the cargo compartment where people, cargo, and loading equipment move around, making the arms susceptible to damage and presenting a collision hazard to people and equipment—it is recommended that the outer tips of the arms be rounded to reduce the potential of injuring the loading personnel. The rigid retainer rod requires the load bar compartments to be deep enough to provide clearance between the bars and the rod, which would allow the load bars to rattle in their compartments. The rack length is dependent on a particular E-slot spacing, is non-adjustable, and substantially limits the racks' use to horizontal E-track. Also, the load bars are removed from the racks in a direction away from the side wall and toward the interior of the cargo area, posing a risk to personnel and cargo.

BRIEF SUMMARY

I have invented a load bar storage rack that provides secure, quiet, safe, unobtrusive storage for multiple load bars along the sidewall of the cargo area of a truck, using standard E-track and E-clip structure (or their equivalents).

The rack has a generally U-shaped bar-holding base. The base has a rear side adapted to be mounted to E-track slots on the sidewall of the cargo area, a closed end, a front side comprising two vertically-spaced horizontal cantilevered retainer arms, and an open end for inserting and removing load bars in a vertical plane parallel to the side wall of the cargo area. A flexible, adjustable-length retainer strap fastens horizontally on the rack in a loop or reverse U-configuration to selectively close off the open end of the rack and secure one or more bars tightly therein.

The base includes at least two E-clips suitable for mounting the rack to the slots in the E-track. In a further form, the base includes an adjustable length E-clip mounting arm that allows at least one of the clips on the rack to be adjusted to span different E-track spacing as well as different E-slot spacing, on both horizontal and vertical E-track. In the preferred form, the load bar storage capacity of the base remains constant when the mounting rail is lengthened.

In a further form, the retainer arms are flexible. In a further form, the flexible retainer arms are biased to angle inwardly from the closed end of the rack toward the sidewall when the rack is not loaded.

"E-track" and "E-slot" and "E-clip" are used herein to mean industry standard track, slot, and clips, as well as any functional equivalents suitable for securing latch-equipped load bars to the side walls of the cargo area, and the terms "track", "slot", and "clip" should be understood herein to include both E-track/slot/clip and equivalent structures. While E-track slots are normally arranged in a vertical orientation, whether the track is horizontal or vertical, the rack of the present invention can be modified for other slot/clip orientations by mounting the clips or other latching mechanisms to match the orientation of the existing slots.

The rack may be mounted at any location or height in the cargo area, provided that enough clearance remains near the open end to insert and remove load bars in a plane parallel to the side wall on which the rack is mounted. A preferred mounting location is adjacent the cargo area door's header or frame, with the open end of the rack facing the door frame, so that the door frame might catch any load bars that fall outwardly along the wall toward the door if the retainer strap is unfastened.

These and other features and advantages of the invention will become apparent from the detailed description below, in light of the accompanying drawings.

DETAILED DESCRIPTION

Figure 2:
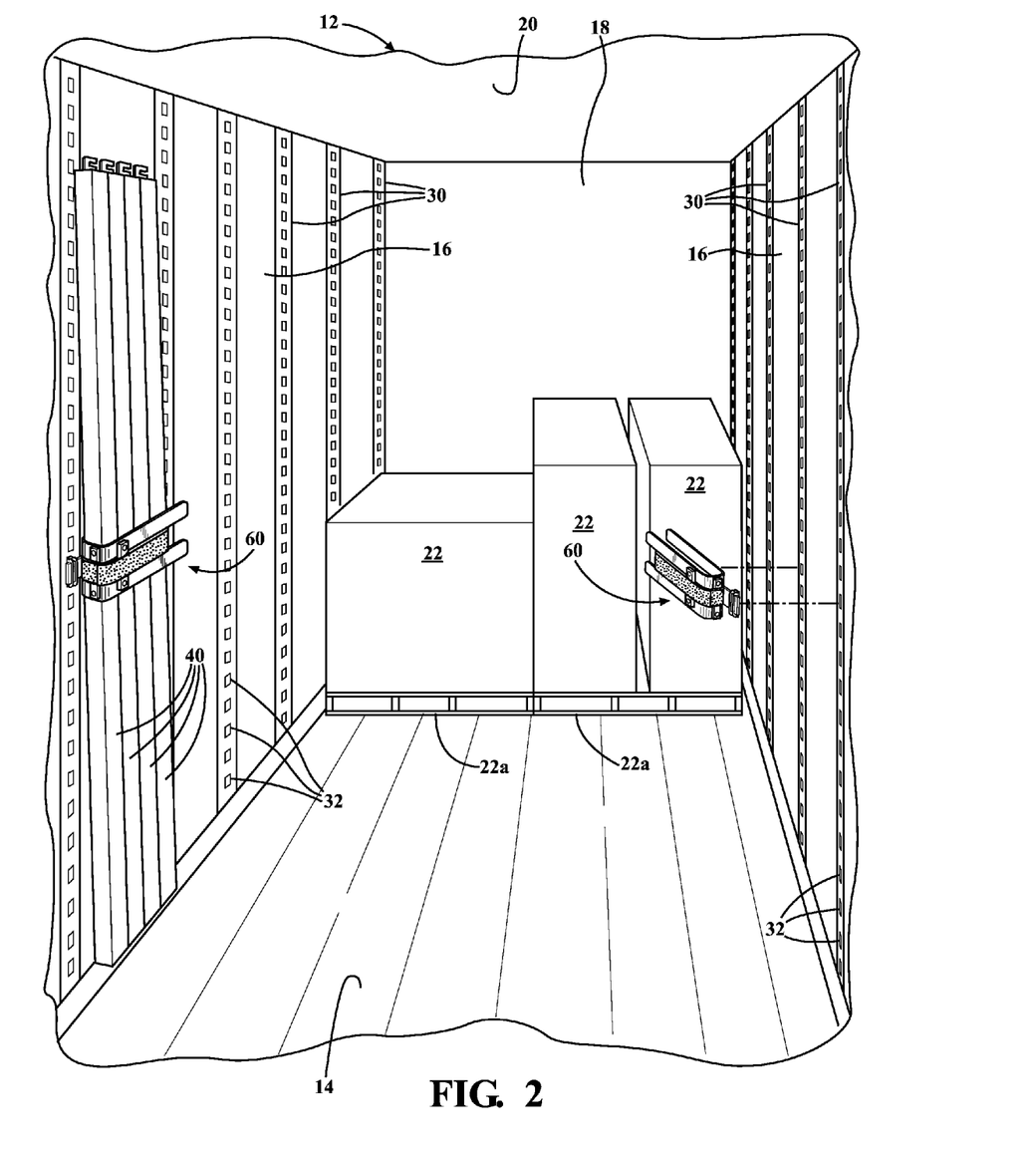
FIG. 2 is similar to FIG. 1, but shows load bar storage racks according to the present invention, respectively installed and exploded from the side walls.

Referring first to FIG. 2, two load bar racks 60 are shown installed on (left side) and exploded from (right side) E-tracks 30 on sidewalls 16. The racks are illustrated in an exemplary and currently preferred form in order to teach how to make and use the claimed invention. The installed rack 60 is shown holding and securing a set of load bars 40 in a vertical orientation against side wall 16. While racks 60 may be used in vertically spaced pairs along a common side wall, I have found a single rack per set of stored load bars to be sufficient. Racks 60 are shown with their open ends pointing toward end wall 18, but they are equally useful and just as easily installed with their open ends facing the cargo area door.

Referring next to FIGS. 3 through 6, rack 60 has a generally U-shaped base defined by a rear side 62, a closed end 64, a front side 66, and an open end 68. By generally U-shaped is meant both rounded and squared open-ended shapes having a width approximating that of the load bar thickness, and a length sufficient to receive and store multiple vertically-oriented load bars in a planar, single-stack array like that shown. At least the front side 66 comprises two vertically-spaced horizontal cantilevered retainer arms or bars 66. In the illustrated example, front retainer arms 66 are the ends of two continuous spaced parallel metal bars bent or otherwise formed into a U-shape to define the rack base as spaced rear side bars 62, spaced end bars 64, and spaced front arms 66. The bars 62, 64, 66 are secured in their spaced relationship with vertical braces 62b, 64b, 66b or other suitable structure to form the rack base. Welds, rivets, threaded fasteners, structural adhesives and other connectors are suitable for securing the pieces of the rack. It would also be possible to cut or cast or mold the rack base substantially as one piece, even with the spaced-bar structure shown, for example from flexible metals or strong plastics. It would also be possible to form the rear side 62 and closed end 64 as essentially solid walls or some other form rather than as spaced bars, provided the front side 66 retains the spaced cantilever bar configuration with room for a strap to be cinched inwardly between them toward closed end 64. And while two spaced bars are shown, it would be possible to form the rack base from three or more spaced parallel bars.

Front retainer arms 66 are cantilevered from closed end 64, with their free ends terminating adjacent the open end 68 of rack 60, and are preferably somewhat flexible with a bias inwardly toward side wall 16. When rack 60 is empty, open end 68 may accordingly be narrower than closed end 64. This flexibility and narrowing of the front side of the rack when empty may reduce the likelihood of the rack being snagged or damaged.

The width of closed end 64 is equal to or greater than the width of load bars 40, with a preference for a close match width-wise to reduce or eliminate rattling and movement of bars 40 toward and away from side wall 16 once inserted in rack 60.

While somewhat flexible arms 66 are preferred, they may also be substantially rigid, such that the width of open end 68 is equal or greater than the width of closed end 64 even when the rack is empty.

While flat bar members 62, 64, and 66 are shown and preferred, it will be understood that bars with other cross-sectional geometry would be possible.

Figure 3:
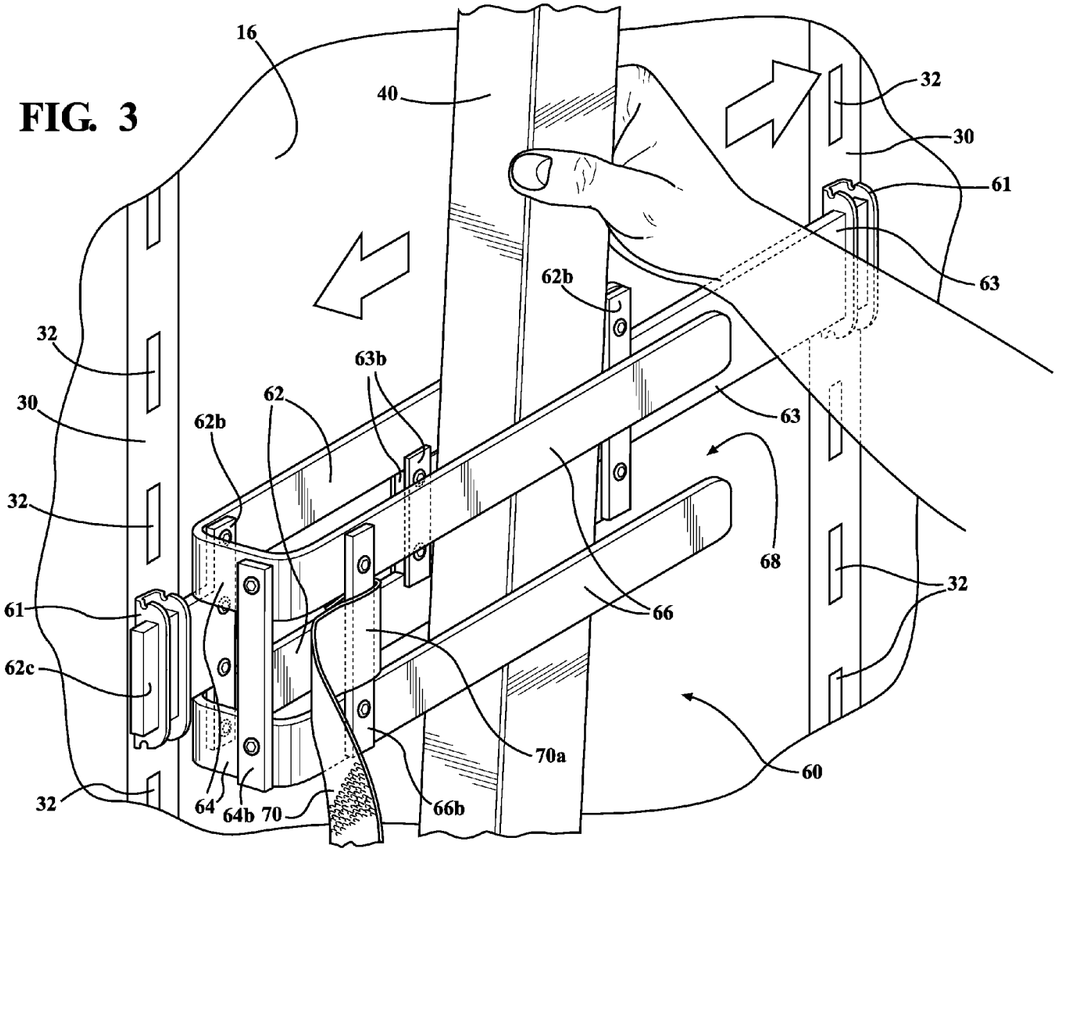
FIG. 3 is a detailed rear perspective view of one of the racks of FIG. 2, showing the manner of insertion and removal of a load bar in the open end of the rack.
Figure 4:
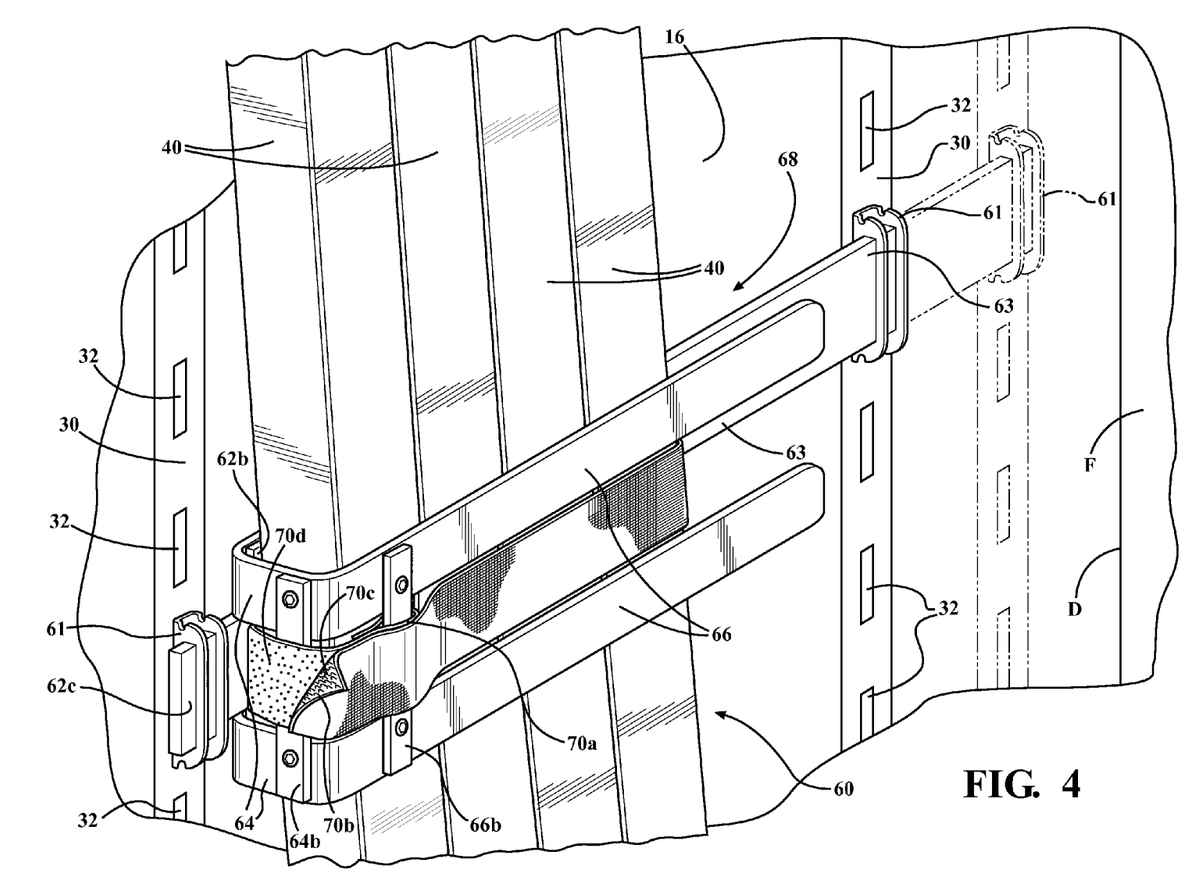
FIG. 4 shows the rack of FIG. 3 loaded with multiple bars, the bars secured with a strap.

As best shown by the arrows in FIG. 3, load bars 40 are inserted into and removed from the open end 68 of rack 60 in a plane substantially parallel to side wall 16. As best shown in FIG. 4, the load bars 40 are preferably arranged at least vertically neutral in the rack, or if leaning then at an angle leaning toward closed end 64, before being secured in place.

Rack 60 includes a retainer strap 70 for wrapping at least partway around any load bar(s) 40 inserted in the rack. Strap 70 may be a nylon or canvas strap as shown, or it may be any flexible device (chain, rope, cable, bungee cord, etc.) capable of being wrapped around the load bars and secured to itself or to some other portion of rack 60 to hold the load bars in the rack cinched against the closed end, and the term "strap" should be construed to include such flexible equivalents. In the illustrated example, strap 70 has a fixed end 70a secured to front side vertical brace 66b, and a free end 70b having inner-facing hook and loop material 70c positioned to mate with outer-facing hook-and-loop material 70d on an intermediate portion of the strap. Other means for securing free end 70b of strap 70 in a bar-securing position on the rack may be used, including but not limited to snaps, clips, buckles, hooks and the like. Where strap 70 is rope-like or otherwise is sufficiently flexible, simply tying the free end 70b to some other portion of the strap or the rack may be sufficient, if permitted by any applicable load-securing regulations.

Rack 60 is secured to E-tracks 30 on side wall 16 with mating E-clips 61 fastened to mounts 62c and 63 along the rear side 62 of rack 60. In the illustrated example, mounts 62c and 63 extend outwardly from the ends of the U-shaped base 62, 64, 66, and in the preferred embodiment at least one of the mounts is lengthwise adjustable to adapt the rack 60 to different E-track spacing. Arm 62c is shown as a short fixed bar attached to vertical rear brace 62b. Arm 63 is movable relative to the rack base; it may be retracted so that its clip 61 is located approximately at open end 68 of the rack base, or it may be extended partially (solid lines FIG. 4) or fully (phantom lines FIG. 4) to connect its clip 61 to the most convenient E-track 30, depending on the spacing of the track 30.

In the illustrated example, mount 63 is formed as a third rail or bar slidingly mounted between rear bars 62 by a pair of spaced followers 63b (FIG. 5) trapped between vertical braces 62b in a sliding fit on arms 62. Other forms of length-adjustment mechanism would be possible, including but not limited to wheeled followers or carriages, detent mechanisms, and telescoping members.

In the illustrated example, the U-shaped, bar-securing base portion of rack 60 defined by bars 62, 64, 66 has a fixed length, even though clip mounts 62c and/or 63 may be length-adjustable. It might also be possible to make the rack base adjustable in length, instead of or in addition to providing length-adjustable clip mounts.

Figure 5:
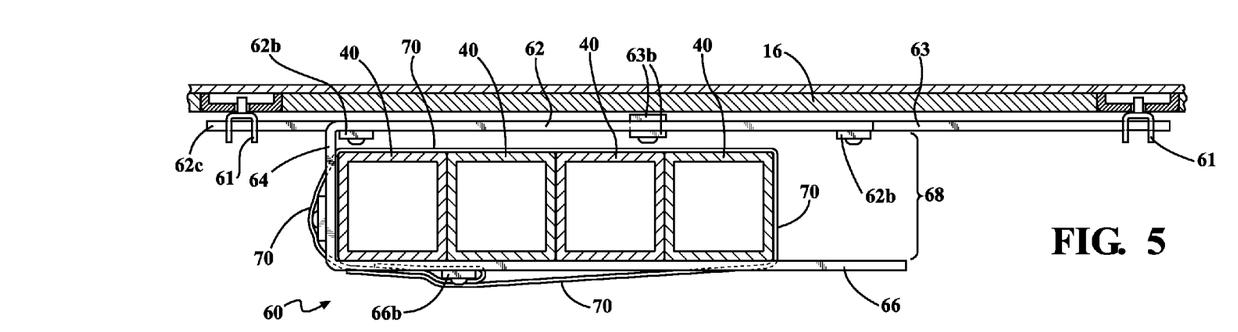
FIG. 5 is a top plan view of the rack of FIG. 4, with the side wall and load bars sectioned.
Figure 6:
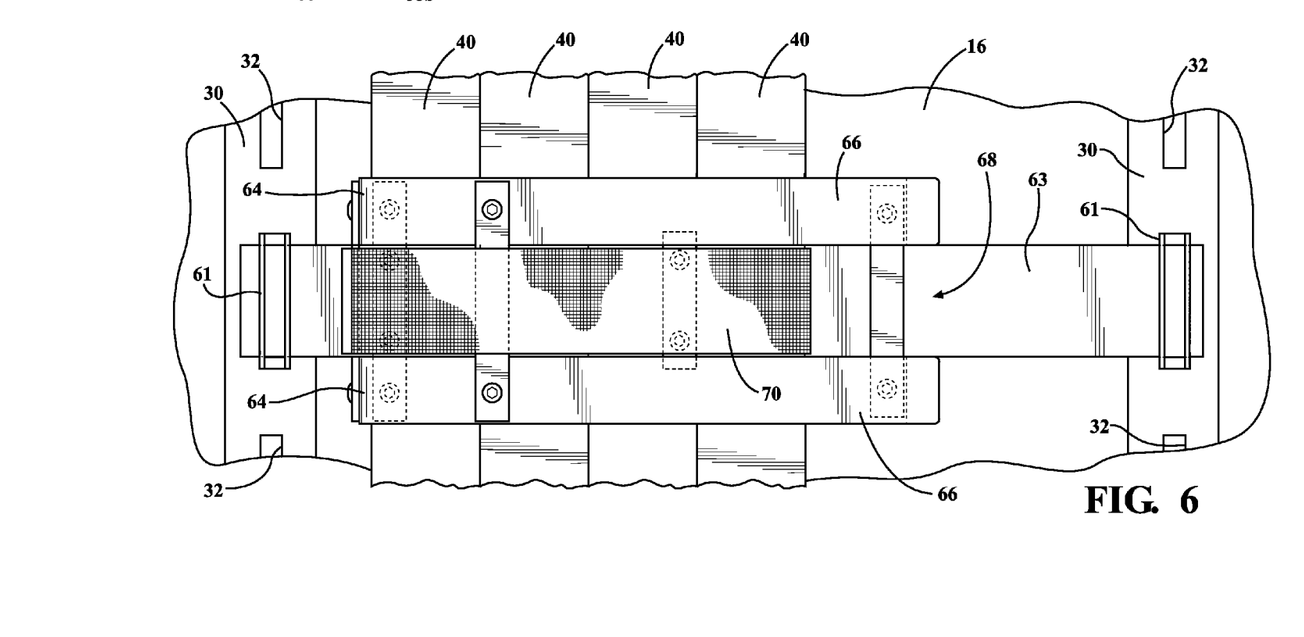
FIG. 6 is a front elevation view of the rack of FIG. 5.

As shown in FIGS. 4 through 6, retainer strap 70 allows any number of load bars 40 capable of fitting in the U-shaped rack base to be secured tightly in the rack, with little or no rattling, particularly where strap 70 has the essentially infinite adjustment capability provided by hook-and-loop fastener 70c, 70d running along a significant portion of its length. Strap 70 is preferably aligned with the space between the bars of the rack, and can be wrapped around bars 40 and secured in the space between bars 62, 64, 66 as best seen in FIGS. 4 and 6. Vertical bracing 64b and 62b may be used as intermediate positioning or bracing points for strap 70 as it is wrapped around the bars 40.

FIG. 4 shows a preferred mounting orientation for rack 60 in cargo areas where the door is framed by a header F. Open end 68 faces cargo door area D, with just sufficient space between open end 68 and door D to allow load bars to be inserted into and removed from the rack in a plane parallel to side wall 16. If a bar 40 is released or jarred out of rack 60 when strap 70 is unfastened, the bar will tend to fall parallel to side wall 16 and be stopped by the header before it is free enough from rack 60 to fall inwardly into the cargo area.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. Relational terms such as "parallel", "horizontal", "vertical" and the like should be understood to include not only exact relationships as well as relationships that are substantially so, even if not expressly stated. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed:

1. A rack for storing load bars in the cargo area of a cargo van or truck equipped with load bar mounting tracks on a side wall of the cargo area, comprising:
    a generally U-shaped bar-holding base comprising a rear side adapted to be mounted to mounting track slots on the sidewall of the cargo area, a closed end generally perpendicular to the rear side, a front side comprising two vertically-spaced horizontal cantilevered retainer arms spaced from the rear side by the closed end and generally parallel to the rear side, and an open end defined between terminal ends of the retainer arms and the rear side for inserting and removing vertically-oriented load bars in a vertical plane generally parallel to the retainer arms and the rear side; and,
    a flexible, adjustable-length horizontal retainer strap means on the rack, the retainer strap means operable to selectively close off the open end of the rack between the retainer arms at various distances from the closed end in order to secure one or more load bars tightly against the closed end.

2. The rack of claim 1, wherein the retainer strap means is secured at one end to the closed end of the rack.

3. The rack of claim 1, wherein the rear side of the base further comprises two clips for mounting the rack to the mounting track slots.

4. The rack of claim 1, wherein the front side retainer arms are flexible.

5. The rack of claim 4, wherein the flexible front side retainer arms are biased to angle inwardly such that the open end has a width less than the closed end if the rack is empty.

6. The rack of claim 1, wherein the U-shaped base has a width approximating the thickness of a load bar.

7. In combination with a cargo van or truck having side walls equipped with load bar mounting tracks in a cargo area, a rack for storing load bars in the cargo area, comprising:
    a generally U-shaped bar-holding base comprising a rear side mounted to two or more of the mounting tracks on one of the sidewalls, a closed end, a front side comprising two vertically-spaced horizontal cantilevered retainer arms spaced from the rear side by the closed end and generally parallel to the rear side, and an open end defined between terminal ends of the retainer arms and the rear side and adapted for inserting and removing vertically-oriented load bars horizontally in a vertical plane generally parallel to the side wall of the cargo area; and,
    a flexible, adjustable-length horizontal retainer strap means on the rack, the retainer strap means operable to selectively close off the open end of the rack between the retainer arms at various distances from the closed end in order to secure one or more load bars tightly against the closed end.

8. The combination of claim 7, wherein the cargo area includes a door with a header or similar inwardly-extending frame portion vertically framing the door, and wherein the rack is mounted on the sidewall adjacent but spaced from the header a distance less than the length of a load bar and with the open end facing and aligned with the header or frame.

9. A rack for storing load bars in the cargo area of a cargo van or truck equipped with load bar mounting tracks on a side wall of the cargo area, comprising:
    a generally U-shaped bar-holding base comprising a rear side adapted to be mounted to track slots on the sidewall of the cargo area, a closed end, a front side comprising two vertically-spaced horizontal cantilevered retainer arms, and an open end for inserting and removing vertically-oriented load bars in a vertical plane generally parallel to the retainer arms; and,
    a flexible, adjustable-length horizontal retainer strap means on the rack, the retainer strap means operable to selectively close off the open end of the rack between the retainer arms at various distances from the closed end in order to secure one or more load bars tightly against the closed end, wherein the rear side of the base further comprises two clips for mounting the rack to the mounting track slots, and wherein the rear side of the rack includes an adjustable-length mounting arm extendable horizontally beyond the U-shaped base, and at least one of the clips is mounted on the adjustable length mounting arm for spacing adjustment relative to the U-shaped base and the other clip.

10. The rack of claim 1, wherein the rear side of the rack includes an adjustable-length mounting arm extendable horizontally beyond the U-shaped base, and at least one of the clips is mounted on the adjustable length mounting arm for spacing adjustment relative to the U-shaped base and the other clip.

* * * * *

UNITED STATES PATENT AND TRADEMARK OFFICE
CERTIFICATE OF CORRECTION

| | |
|---|---|
| PATENT NO. | : 8,764,358 B2 |
| APPLICATION NO. | : 13/680136 |
| DATED | : July 1, 2014 |
| INVENTOR(S) | : Joseph M. Bose |

Page 1 of 1

It is certified that error appears in the above-identified patent and that said Letters Patent is hereby corrected as shown below:

In the Claims

Col. 6, Claim 10, line 66, change "1" to --3--.

Signed and Sealed this
Twenty-fifth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,764,358 B2 | Page 1 of 1 |
| APPLICATION NO. | : 13/680136 | |
| DATED | : July 1, 2014 | |
| INVENTOR(S) | : Joseph M. Bose | |

It is certified that error appears in the above-identified patent and that said Letters Patent is hereby corrected as shown below:

In the Claims:

Column 6, Claim 10, line 66, change "1" to --3-- (as corrected to read in the Certificate of Correction issued August 25, 2015) is deleted and patent is returned to its original state with Column 6, Claim 10, line 66 in patent to read --1--

Signed and Sealed this
Twenty-second Day of December, 2015

Michelle K. Lee
*Director of the United States Patent and Trademark Office*